Patented Oct. 24, 1950

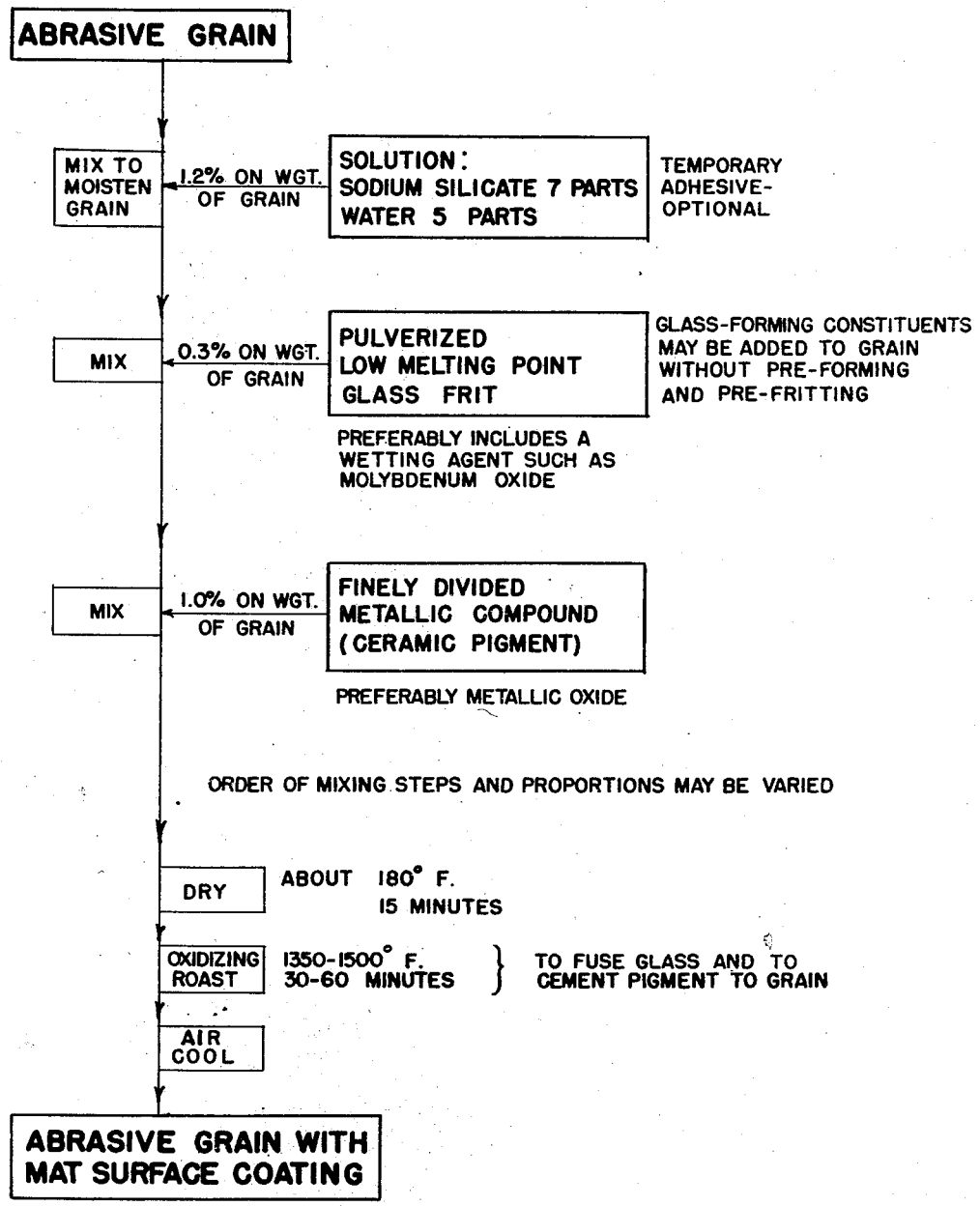

2,527,044

UNITED STATES PATENT OFFICE 2,527,044

SURFACE-COATED ABRASIVE GRAIN

Samuel F. Walton, Kenmore, and Leon B. Bassett, Alfred, N. Y., assignors to The Exolon Company, Tonawanda, N. Y., a corporation of Massachusetts Application June 14, 1945, Serial No. 599,524

3 Claims. (Cl. 51—308)

This invention relates to the surface treatment of abrasive grain, and relates more particularly to the production of a mat surface coating on abrasive grain.

This invention was developed in connection with, and finds probably its maximum utility in, the coating of fused alumina abrasive grain, to increase the tenacity with which the grain is held by a bonding medium, for example, the glue used in making set-up wheels or paper and cloth abrasives, or the resin bonds used in making resin-bonded grinding wheels. The invention is also useful, however, in improving other properties of fused alumina grain, and in coating other abrasive grain, such as silicon carbide, in order similarly to improve its properties.

Abrasive grain which has been surface-treated to increase the tenacity with which it is held by a bonding medium, is widely sold under the name tenacity treated grain. The primary purpose of these treatments has been, as already stated, to increase the adhesion between the abrasive grain and the bond, this property being called the tenacity of the grain. Secondary purposes have been to enhance the capillarity of the grain and to improve its packing quality. The capillarity of the grain determines the ease with which glue or other bonding medium spreads over the grain surfaces. The packing quality of the grain is measured by its resistance to flow under the application of local pressure, and such resistance is a desirable property in the manufacture of set-up wheels and other abrasive products from the abrasive grain. It will be understood by those skilled in this art that these purposes must be achieved without destroying the free-flowing, granular characteristics of the abrasive grain, and that the coating must itself adhere tenaciously to the grain.

As is well known, synthetic abrasive grain as ordinarily manufactured has smooth, shiny surfaces, and is characterized by low capillarity and little resistance to flow under local pressure. It has long been known that a treatment of such abrasive grain which causes the grain to lose its smooth, shiny, glass-like surfaces and take on rough, lusterless surfaces, increases the adhesion between the abrasive grain and the bonding medium, increases the capillarity of the grain, and improves its packing quality. Heretofore, such surface treatments have followed one another of two principal types. In one of these types, the surfaces of the abrasive grain have been caused to become pitted, by a process resembling etching, as disclosed in United States patents to Higgins et al. 944,436 and Hartmann 1,482,792 and 1,482,793. In the other of these types, the abrasive grain is unevenly coated with a vitrified film, made from clay slurry or the like, producing a hill-and-valley effect with protuberances or prominences of vitrified material extending relatively high above the general plane of the original grain surface, as disclosed in Nicholson United States Patent 1,910,444.

We have discovered that a superior result, not only as to tenacity but also as to capillarity and packing, may be obtained by coating the abrasive grain with a relatively smooth, thin coating, which may perhaps best be described as having a mat appearance, and which coating comprises discrete, finely divided particles of solid material cemented to the refractory grains by a fused, glassy, ceramic film, said particles being of such material as to be substantially unattacked by the glassy film even when molten. Although this mat surface coating is smooth to the naked eye, slight roughness is visible under the microscope. The relationship of this mat surface to the shiny surface of the original grain may be compared to the relationship between a flat-paint surface and an enamel surface. The relatively high protuberances of the clay-slurry type of tenacity treated abrasive grain are lacking in abrasive grain coated in accordance with our invention, and the differences between the two may be plainly seen under the microscope.

We have also discovered that abrasive grain coated in accordance with our invention is decidedly tougher, that is to say, has greater resistance to fracture, than the same grain uncoated. As will be pointed out hereinafter, this makes for greater abrasive efficiency.

The principal object of the present invention is to provide a mat surface coating on abrasive grain, which coating is extremely adherent; possesses to a very marked degree the above mentioned desirable properties of tenacity, capillarity and packing; increases the toughness of the abrasive grain; and is capable of being produced in a simple and economical manner.

In order that the nature of our product shall be better understood and its manufacture may be followed, a preferred process is illustrated in the accompanying flow-sheet drawing.

According to the preferred form of this invention, we moisten the abrasive grain with a sodium silicate solution as a temporary adhesive. To the adhesive-moistened grain is then added a frit which comprises an already-formed, low melting point glass which may advantageously be of the soda-lead-boron silicate type, and which glass includes as an extremely desirable if not essential ingredient a wetting agent adapted, upon subsequent fusion of the glass, to lower the surface tension of the glass with respect to the surfaces of the abrasive grain. A finely divided material, substantially insoluble in the molten glass, preferably a metallic oxide ceramic pigment, is added to the adhesive and frit-coated grain, after the frit has been thoroughly mixed with the adhesive-moistened grain. The metallic oxide ceramic pigments commonly used in coloring ceramic wares are finely divided particles which are substantially unattacked by molten glass of the type used in forming the glassy film of this invention, and hence are suitable for use in this invention. The term "pigment" will be used hereinafter as meaning such substantially unattacked, finely divided, metallic oxide particles. After thorough incorporation of the pigment in this mixture, the damp mass is dried to dehydrate the sodium silicate. The dried mass is then roasted in a rotary kiln at a temperature sufficiently high to cause the silicate of soda to become an integral part of the insoluble glass, and to fuse the glass and cause it to flow smoothly over the surfaces of the grain. On the other hand, the temperature must be sufficiently low so as not to cause an excessive reaction between the pigment and the molten glass. The roasted granules are then air cooled.

We shall now describe in more detail the application of our invention to the tenacity treatment of fused alumina abrasive grain.

The low melting point glass frit may be made from a batch of the following ingredients, all in finely divided form and all being given in parts by weight:

| | |
|---|---|
| Borax | 382 |
| Red lead | 228 |
| Flint | 240 |
| Ammonium molybdate | 34 |
| Total | 884 |

This mixture is melted to a sufficiently fluid liquid glass, for example to a temperature of about 2000° F.; and is then poured into water to cause it to fracture into small pieces while solidifying; dried; and ball milled until the particle size of the frit is considerably smaller than that of the grain to be coated, for example, until from 95% to 98% of the resulting frit will pass through a 200 mesh screen for use with No. 36 grit fused alumina. The ceramic empirical formula of this frit is:

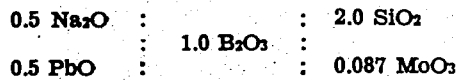

The proportions of soda, lead and boron may be varied within considerable limits, and other ingredients may be substituted, provided the ingredients and proportions adopted are such as to obtain a low melting point glass having a softening point not substantially exceeding 1300° F. The molybdenum oxide wetting agent may be added as such or as a salt other than ammonium molybdate, or as metallic molybdenum or ferromolybdenum, and its proportion in the final frit may vary quite considerably, the range being from about 0.1 to 3 per cent by weight based on the other constituents of the frit. Larger quantities of molybdenum oxide are undesirable principally from the standpoint of cost and smaller quantities, although producing some desirable effects, are not adequate for best results.

The use of the above mentioned wetting agent in ceramic glazes and bonds is disclosed and claimed in a prior application of Charles R. Amberg and Harold C. Harrison, filed May 12, 1942, now Patent 2,422,215, issued June 17, 1947. That patent also discloses the use of tungsten, vanadium or uranium in place of molybdenum, and we believe that these wetting agents would also be satisfactory in the process of our invention, although we have not tried them. We have found that the use of such a wetting agent is practically essential to the complete success of a coating process of the character herein disclosed, as otherwise the glass will not coat the abrasive grain as satisfactorily nor produce as good a mat surface coating. On the other hand, a mat surface coating can be produced on abrasive grain by following our teachings with the omission of the wetting agent, and, although the product is inferior to that obtained with the wetting agent, it nevertheless represents an improvement over the uncoated grain. We therefore do not wish to be limited to the employment of the wetting agent.

The fused alumina abrasive grain to be coated is introduced into a conventional mixer, and a silicate of soda solution is added in sufficient amount to moisten the grain thoroughly without having it seem actually wet. The sodium silicate solution may be made up of seven parts of silicate of soda to five parts of water, by weight. A suitable silicate of soda is N Brand as made by the Philadelphia Quartz Company, which has a ratio of alkali to silica of 1:3.22, and a Baumé gravity of 41.1°. This particular silicate of soda analyzes 8.85% Na$_2$O; 28.5% SiO$_2$ and the remainder water.

After the grain and the silicate of soda solution have been thoroughly mixed in the mixer, there is put in the mixer the finely pulverized frit prepared as above described. The mixing action is continued until the frit is uniformly distributed over the surfaces of the moistened grain. A suitable pigment, likewise in finely divided form, is then added to the mixture, and the mixing continued until an apparently uniformly coated material is obtained. The object of this sequence of mixing operations is to secure successive layers of temporary adhesive, frit and pigment on the grain.

We prefer to use as the pigment a metallic oxide, such as red iron oxide, black iron oxide, or titanium oxide, because of the very fine state of subdivision in which these pigments can be commercially obtained and the very slight reaction which they undergo with the frit and the sodium silicate in the subsequent roasting step. Other suitable pigments are levigated aluminum oxide, manganese dioxide, chromite and zirconium oxide.

The thoroughly mixed damp mass may then be transferred from the mixer to a conventional rotary drier. Here it is subjected to a drying temperature of about 180° F. for about 15 minutes. In this drying operation, the sodium silicate is dehydrated. After this drying, the coating is hard enough to resist rubbing but would be affected by water.

The dried mass is then transferred to a conventional rotary kiln in which an oxidizing atmosphere is maintained by the usual combustion gases. The mass is raised to a temperature above 1350° F. and preferably not exceeding 1500° F., for a period of about 30 to 60 minutes. A temperature of at least 1350° F. is necessary to cause the silicate of soda to combine with the frit to form a completely insoluble glass, while at the same time causing this glass in its molten state to flow over the surfaces of the granules to form a substantially uniform coating. The sodium silicate, although it reacts with the frit and aids it in cementing the pigment to the grain surfaces, is used primarily as a temporary adhesive for holding the frit and the pigment uniformly distributed on the grain surfaces during the mixing and drying steps. The temperature is kept below 1500° F. because a higher temperature is apt to change the color of the pigment unduly and also to dissolve a considerable amount of the pigment in the glass, whereas, in order to obtain the desired mat surface, it is necessary that the pigment simply be cemented to the grain by the glass, with only a superficial, if any, reaction between the pigment and the glass.

From the roaster, the coated grain is conducted to a conventional cooler, where it is air-cooled. The coated abrasive grain may then be sized on conventional graders, and packaged for storage or shipment.

The quantities of coating materials to be used depend upon the size of the grain, since the amount of surface to be coated varies with the grain size. It is usually more convenient to coat a range of grain sizes, and to grade the grain after the coating has been completed. For a grain fraction of sizes 16, 20, 24, 30 and 36 (commonly called 16 to 36), a suitable base formula is as follows, in percent by weight based on the weight of the grain:

|  | Percent |
| --- | --- |
| "N" Brand silicate of soda | 0.7 |
| Water | 0.5 |
| Frit | 0.3 |
| Red iron oxide | 1.0 |

For a larger size grain fraction, such as sizes 8 to 14, seven-eighths of the above base formula may be employed. For smaller size grain fractions, the amount of the above base formula is increased to, for example, one and one-eighth of the base formula for sizes 46 to 60, up to one and three-eighths for sizes 100 to 180.

The proportion of pigment to be used in the base formula depends upon the fineness of the pigment, its solubility in the glass and its covering power. Black iron oxide and titanium oxide may be used in the same proportion as stated above for red iron oxide. About twice as much levigated aluminum oxide or manganese dioxide is required. Chromite need only be used in about one-half the quantity of red iron oxide. About one-third more of zirconium oxide would be needed.

If desired, a small amount of the pigment to be ultimately used may advantageously be incorporated directly in the frit. Thus, for example, 64 parts by weight of red iron oxide may be included in the frit batch formula. This amount will be dissolved or dispersed in the frit and will tend to diminish subsequent reaction between the frit and the pigment during the roasting step. In such case, the amount of pigment added to the grain may be reduced by somewhat more than the amount included in the frit.

The abrasive grain does not conglomerate during this treatment, but remains free-flowing and granular. The pH of the coated grain is neutral, which is a distinct advantage over many prior commercial tenacity treated abrasive grains. A neutral pH indicates that the coating is entirely insoluble in water and is non-reactive with the bonds with which it is later to be used. The color of the coated grain is for all practical purposes the same as that of the pigment used. The coating is extremely thin, unusually hard, and so thoroughly attached to the grain that it is difficult to remove it mechanically. The finished grain does not appear to have a vitrified coating, and yet the pigment is firmly held to the grain surfaces by the ceramic action of the fused glass. The coating is smooth to the naked eye but has sufficient microscopic roughness to have a mat appearance. By virtue of this mat surface, the tenacity, capillarity and packing of the grain are greatly enhanced, as above described.

The above described coating produces the surprising result of increasing the toughness of the fused alumina abrasive grain, or, in other words, reducing its propensity to fracture under conditions of service. It is believed that this increase in toughness is due to the extremely thin film of glass which coats the abrasive granules with approximate uniformity, and which forms, in effect, a jacket shrunk on each individual granule. The pigment is believed to play little or no part in this phenomenon, although it plays the major part in the foregoing improvement in the tenacity, capillarity and packing of the abrasive grain.

The mat surface coating on abrasive grain produced as above described is characterized by the fact that the greater proportion of the pigment is on the outside of the coating and is not covered by the glass, but, on the contrary, the glass is in the form of an extremely thin film largely between the pigment and the abrasive grain, the glass serving as a cement or bond joining the under surfaces of the pigment particles to the grain surfaces. This is the ideal condition for the purposes of the present invention. Any pigment that becomes dissolved in the glass or so disseminated in the glass as to be entirely surrounded by the glass, is lost so far as concerns producing the desired microscopically rough surface for tenacity treated abrasive grain.

The coating process above described is particularly well adapted to achieve the foregoing desired result of cementing the under surfaces of the pigment particles to the grain surfaces. To this end, the quantity of glass is kept as small as feasible in relation to the quantity of pigment, although both must be sufficient to cover entirely or very nearly the total area of grain surface to be coated. Also, the softening point of the glass and the roasting temperature are kept low to minimize any reaction between the glass and the pigment. Furthermore, the above described sequence of mixing operations and the resulting layering effect, contribute to the desired result, as does also the use of the frit. However, various changes may be made in the preferred process, with varying effects on the economy of the coating process and the effectiveness of the resulting product. For example, with some sacrifice in the characteristics of the product, the sodium silicate solution, the frit and the pigment may be simultaneously mixed with the abrasive grain. Also, the frit may be replaced by a mixture of the glass-forming constituents and the wetting agent, and the glass formed in situ on the grain during the roasting step.

Although the pre-forming and fritting of the glass is, as mentioned above, not entirely essential, it is highly desirable. The use of the frit enhances the convenience and uniformity of the manufacturing operations. Moreover, and more important, the use of the frit makes it possible to use a lower temperature during the roasting step than would otherwise be necessary.

A very important function of the frit is that it provides a convenient means for insuring a uniform distribution of the wetting agent. If the glass were formed in situ on the abrasive grain, and the wetting agent were added as such to the grain along with the glass-forming materials, it would be exceedingly difficult, if not impossible, to obtain a uniform distribution of the very small quantity of wetting agent throughout the large mass of the abrasive grain. Principally for this reason, but also for other reasons as well, the wetting agent functions far more effectively when first incorporated into a frit such as above described.

As has already been stated, a coating which improves the properties of the fused alumina grain to some extent can be produced without using the wetting agent. For best results, however, it is essential to use the wetting agent in order to cause the glass to flow smoothly over the grain in a thin film and to produce a correspondingly thin final coating of glass and pigment. A thin coating is to be preferred because (1) it is less costly; (2) the adherence, toughness and other physical properties of a thin coating are better than those of a thick coating; and (3) the thicker the coating, the more likelihood of the individual abrasive granules conglomerating during the roasting step. Where the abrasive grain is silicon carbide, which is more difficult to wet by a molten glass than fused alumina, the use of the wetting agent is practically essential for producing a satisfactory coating.

To illustrate the extreme thinness of coating which is obtainable by the preferred process above described, we have successfully coated fused alumina grain of No. 500 grit size without conglomeration of the individual abrasive grains or apparent increase in their size. To accomplish this, the frit was ground to a fineness of less than 20 microns, and twice the base formula given above was used. This was done in the laboratory, and it would be quite difficult to handle material of such great fineness in commercial operation.

The use of a temporary binder, like the use of the wetting agent, is not entirely essential but is practically so for the production of a good coating on the abrasive grain. Potassium silicate could be substituted for sodium silicate with equally good results, but at a considerable increase in cost. Nor are we limited to a soluble silicate solution as the temporary binder. We may use glue, dextrin or Goulac (sulphite liquor pitch), or other suitable organic material, as the temporary binder. Such organic binders will burn away during the roasting. In such case, however, it would be necessary to change the composition of the frit in order to obtain a final glass film of the same properties as that resulting from the combination of the frit and the sodium silicate. Any inorganic temporary binder compatible with the frit could also be employed.

Tenacity treated abrasive grain made by prior processes now in commercial use, has been used chiefly as polishing grain in the manufacture of set-up wheels, rolls and belts. Reports from different users have shown from one and one-half to twice as much work successfully performed on a set-up wheel, roll or belt coated with our new fused alumina abrasive grain coated by the preferred procedure above described, as compared with prior tenacity treated grain.

Tenacity treated abrasive grain has not heretofore been widely used in resin-bonded grinding wheels, and no decidedly advantageous results have been noted. Our new coated fused alumina abrasive grain, on the contrary, has shown a decided improvement when used in resin-bonded grinding wheels. The modulus of rupture is increased by 15% or more as compared with similar wheels made from uncoated grain. Tests have shown that the new wheels average 25% more life and 25% more grinding effect than the prior wheels made from uncoated grain.

Attempts have been made to use the heretofore available tenacity treated grains as so-called paper and cloth grain, in the manufacture of paper and cloth abrasives, but without success, that is to say, without any noticeable improvement over uncoated grain. Fused alumina abrasive grain coated in accordance with this invention, however, has given surprisingly favorable results in the manufacture of abrasive coated paper and cloth. In such manufacture, the backing material is covered with glue and then coated with the abrasive grain, after which a sizing coating, usually of the same glue somewhat thinned, is applied on top of the grain. Tests have shown that paper or cloth made with the new abrasive grain is at least 50% better than the same product made with uncoated grain. In some instances, cloth coated with the new abrasive has shown still more striking results, doing nearly six times as much work before the cloth is worn out. Although the abrasive coated paper and cloth are made in the same manner heretofore employed, the substitution of the new grain produces a decided change in operating characteristics. The abrasive product cuts much cooler and does not fill, and therefore continues to cut even when the grain is worn down almost to the surface of the paper or cloth backing.

The striking results above described are believed to be due principally to two factors. First, vastly superior adhesion is obtained between the coated fused alumina abrasive grain and the glue backing. As a result, the coated grain does not pull out of the glue, but remains in place to do its cutting job. Second, the coating toughens the abrasive grain itself, so that the grain does not fracture as readily, and it is believed that the grain therefore rather chips off in service, so that it continues to present sharp cutting edges. With ordinary fused alumina grain, on the contrary, the grain is apt either to pull out of the glue entirely or to fracture deep within the glue so as to leave no exposed cutting edges. The new abrasive is thus a more efficient cutting tool, a larger number of cutting edges per unit of area being presented to the work. Regardless of whether the foregoing is the correct explanation, the fact remains that the new abrasives do act differently in three important and easily observable respects. First, the work does not heat up nearly so much, even though the cutting rate is faster; second, the material removed from the work appears to be in the form of shavings, rather than powder as is usual; and third, the abrasive sheet or belt does not fill, even when cutting relatively soft metals such as aluminum, brass and bronze. These facts constitute proof that the new abrasive cuts more efficiently. So remarkable are the characteristics of these new abrasive sheets and belts that it is even possible to use the same ones both for metal and for wood, which has never previously been practicable.

With silicon carbide abrasive grain, the advantages of our new coating are not as pronounced as with fused alumina abrasive grain. Nevertheless, a marked improvement in the usefulness of the silicon carbide grain for various purposes is obtainable by our tenacity treatment. A similar coating may be applied to other abrasive grains, such as natural garnet, with a consequent improvement in the tenacity, capillarity and packing of the grain.

Although we have thus described our invention in the best form of which we are aware, it will be evident to those skilled in this art that many changes and modifications other than those which we have specifically mentioned, could be made without departing from the spirit of our invention. It is our desire to be limited, therefore, only by the scope of the appended claims.

We claim:

1. As an article of manufacture, fused alumina abrasive grain having a relatively smooth, firmly adherent, mat coating; said coating comprising substantially unattacked, finely divided, metallic oxide particles cemented to the surfaces of the abrasive grain by glass; said glass constituting a thin film extending over the surfaces of said grain and the greater proportion of said particles being so embedded in said glassy film that part of their surfaces are exterior to said film.

2. As an article of manufacture, silicon carbide abrasive grain having a relatively smooth, firmly adherent, mat coating; said coating comprising substantially unattacked, finely divided metallic oxide particles cemented to the surfaces of the abrasive grain by glass; said glass constituting a thin film extending over the surfaces of said grain and the greater proportion of said particles being so embedded in said glassy film that part of their surfaces are exterior to said film.

3. As an article of manufacture, an abrasive product comprising a flexible backing material covered with an adhesive and with fused alumina abrasive grain having a relatively smooth, firmly adherent, mat coating; said coating comprising substantially unattacked, finely divided, metallic oxide particles cemented to the surfaces of the abrasive grain by glass; said glass constituting a thin film extending over the surfaces of said grain and the greater proportion of said particles being so embedded in said glassy film that part of their surfaces are exterior to said film.

SAMUEL F. WALTON.
LEON B. BASSETT.

REFERENCES CITED

The following references are of record in the file of this patent:

UNITED STATES PATENTS

| Number | Name | Date |
|---|---|---|
| 44,918 | Nelson | Nov. 1, 1869 |
| 1,910,444 | Nicholson | May 23, 1933 |
| 2,070,357 | Hillers | Feb. 9, 1937 |
| 2,294,760 | Morris | Sept. 1, 1942 |
| 2,303,284 | Klein | Nov. 24, 1942 |